E. L. BAUMAN.
RESILIENT WHEEL.
APPLICATION FILED FEB. 16, 1916.

1,221,411.

Patented Apr. 3, 1917.

INVENTOR
Edward L. Bauman
BY Raymond A. Parker
ATTORNEY

UNITED STATES PATENT OFFICE.

EDWARD L. BAUMAN, OF DETROIT, MICHIGAN.

RESILIENT WHEEL.

1,221,411.      Specification of Letters Patent.      Patented Apr. 3, 1917.

Application filed February 16, 1916. Serial No. 78,578.

*To all whom it may concern:*

Be it known that I, EDWARD L. BAUMAN, a citizen of the United States, residing at Detroit, county of Wayne, State of Michigan, have invented a certain new and useful Improvement in Resilient Wheels, and declare the following to be a full, clear, and exact description of the same, such as will enable others skilled in the art to which it pertains to make and use the same, reference being had to the accompanying drawings, which form a part of this specification.

My invention relates to resilient wheels and the object of my improvements is to provide a wheel that shall yield readily to inequalities of the road and which is durable.

I secure this object in the device illustrated in the accompanying drawing in which, Figure 1 is an elevation of a wheel embodying my invention, the tire being in section.

Figure 2:
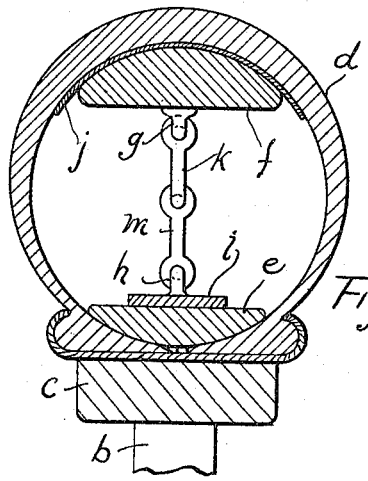
Fig. 2 is a detail cross section of the outer portion of the wheel.

$a$ is a hub, $b$ the spokes and $c$ is the rim of the wheel. This rim, as shown in Fig. 2, is shaped and adapted in the usual way to receive a clencher tire $d$ and hold the same. This tire is of the usual and well known construction.

Figure 4:
Fig. 4 is a detail elevation, partly in section, showing the mode of attaching the springs $i$ to the band $e$.

The clencher tire casing $d$ is held in place by a band $e$ which may be of wood having its inner surface shaped to fit against the inner surface of the casing so as to hold the tire firmly in place upon the wheel. Upon the flat outer surface of the band $e$ I place springs $i$ which are fastened at one end and normally lie close to or against the surface of the band. Said springs are secured by bolts passing through slots in the band, as shown in Fig. 4, so as to permit relative movement of the band along the springs.

Within the tire casing $d$ and lying against the inner surface of the outer portion of said casing is a band $f$ which may be of hickory wood. This is shaped on its outer surface to fit against the inner surface of the tire, as shown in Fig. 2, and its inner surface is flat or of any desired shape so that the band has the necessary strength and resiliency.

$g$ indicates eyes secured at regular space intervals around the inner surface of the band $f$. These eyes may be secured to the band $f$ by bolts extending radially through the same or by any other rigid and permanent construction. $h$ indicates an eye secured rigidly to the free end of each of the springs $i$. An eye $h$ is radially in line with each of the eyes $g$. $k$ is an outer and $m$ an inner link joining the eyes $g$ and $h$ and extending radially to the wheel. The adjacent ends of said links are pivoted together and the other ends are pivoted respectively to the eyes $g$ and $h$.

There is a rubber strip $j$ interposed between the tire $d$ and the band $f$ to prevent abrasion of the tire.

Figure 3:
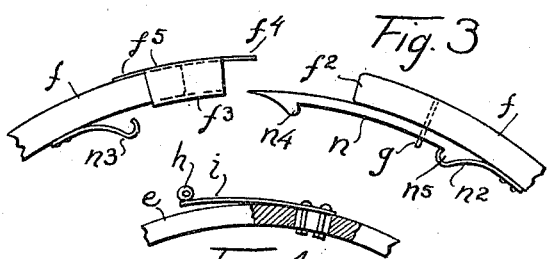
Fig. 3 is a detail showing the band locking device.

The band $f$ is separated at one point and provided with a joint and means for connecting and disconnecting its ends as shown in Fig. 3. Upon one end of the band $f$ is a socked piece $f^3$ having extending portions $f^4$ $f^5$ at its ends, the other end $f^2$ of the band is adapted to enter and fit in the socket $f^3$. $n^2$ is a catch near one end of the band $f$ and $n^3$ is a catch near the other end of said band. $n$ is a coupling hook having engaging lugs or enlarged ends $n^4$ $n^5$. When the two ends of the band $f$ are placed together the end $f^2$ enters the socket $f^3$ and the lug $n^4$ of the hook $n$ is engaged by the catch $n^3$ and the lug $n^5$ is engaged by the hook $n^2$ so that said ends are firmly secured together.

Figure 1:
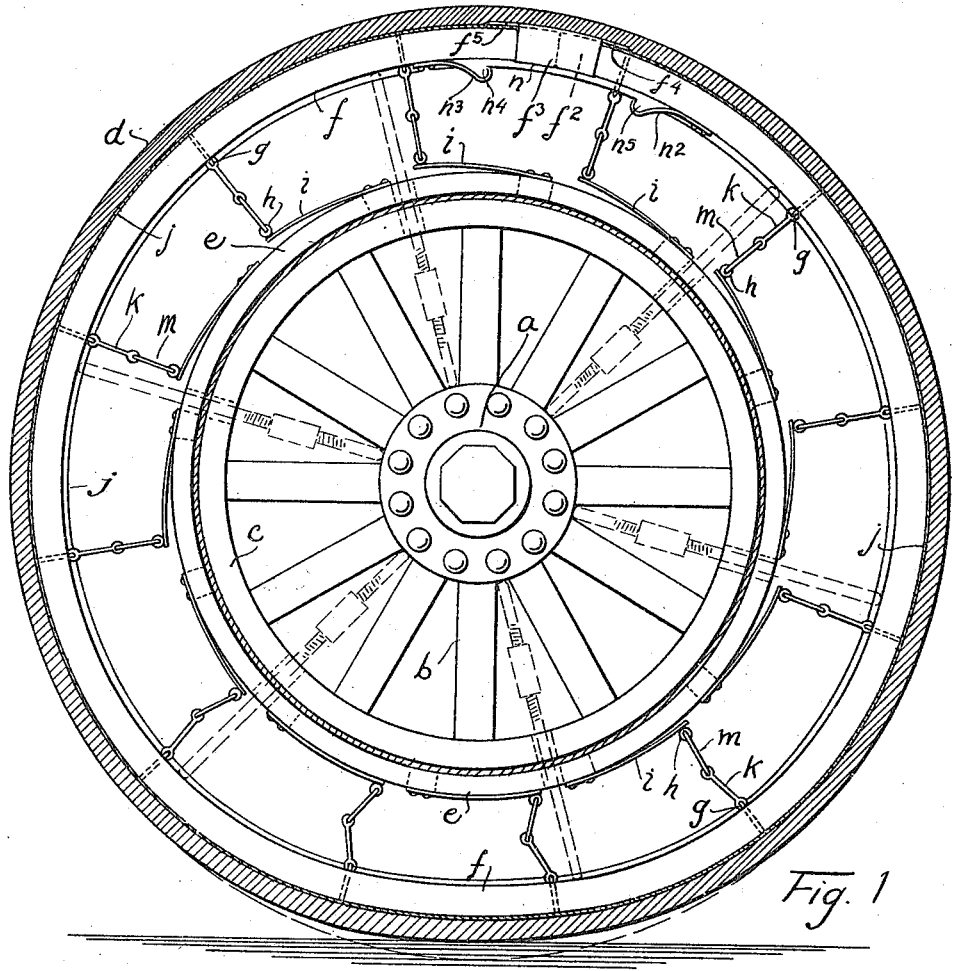

The dotted lines in Fig. 1, indicate screw bolts passing through apertures in the rim of the wheel and acting to press against and expand the band $f$, to set it firmly against the tire and to make the end connections to assemble the tire; when assembled said bolts are removed.

The operation of the above described device is as follows:

The parts being adjusted in position the band $f$ holds the tire casing $d$ in its extended position. When the weight comes upon the wheel or when an obstruction in the road is encountered the lower part of the tire is bent inward also bending the band $f$ out of its normal circular shape as shown in Fig. 1. The links $m$ and $k$ bend at their jointed ends along the lower portion of the wheel as shown in said figure, the tire extending in other portions drawing outward on the springs $i$ as shown at the sides and top of the wheel. Thus the band and tire are maintained in their extended position by tension upon the links $k$ $m$ resisted by springs $i$ and the action of the road or its inequalities do not come directly upon the springs. It is noticed that the springs $i$ only bend outward, their inward motion being resisted by contact with the surface of the band $e$.

What I claim is:

1. In a resilient wheel, the combination of a tire casing, an expanding band therefor, and a series of tension members holding said band in position, springs resisting the outer movement of said tension members, said springs being supported against inward movement, said tension members being constructed so as to yield to, and not resist, an inwardly acting force.

2. In a resilient wheel, the combination of a tire casing, an expanding band therefor, an inner band, springs each of which is secured at one end to said inner band and extends along the outer surface thereof, and a tension member secured to the free end of each of said springs and to said expanding band, said members being constructed so as to yield to and not resist an inwardly acting force.

3. In a resilient wheel, the combination of a tire casing, an expanding band therefor, an inner band, springs each of which is secured at one end to said inner band and extends along the outer surface thereof, and a tension member secured to the free end of each of said springs and to said expanding band, said tension member consisting of links jointed intermediate said bands.

4. In a resilient wheel, the combination of a clencher tire casing, an expanding band therefor, a retaining band therefor, and flexible tension members extending between said bands adapted to elastically resist an outwardly acting force and to yield freely to an inwardly acting force.

5. In a resilient wheel, the combination of a tire casing, an expanding band therefor, an inner band, radially extending links jointed together intermediate said bands, said links being jointed to said bands respectively and an elastic means resisting an outwardly acting force on said links.

6. In a resilient wheel, an expanding band separated at ont point and provided with a detachable means for its ends, said means consisting of a socket upon one end, the other end being adapted to fit in said socket, and a hook secured to one end adapted to pass outside of said socket and to engage a hook upon the other end.

In testimony whereof, I sign this specification.

EDWARD L. BAUMAN.

Copies of this patent may be obtained for five cents each, by addressing the "Commissioner of Patents. Washington, D. C."